US007649458B2

(12) United States Patent
Mrazovich

(10) Patent No.: US 7,649,458 B2
(45) Date of Patent: Jan. 19, 2010

(54) TELEPHONE MESSAGING SYSTEM WITH ACTIVE SECURITY FEATURE

(76) Inventor: Maria Mrazovich, 18131 Langlois Rd., SPC F-18, Desert Hot Springs, CA (US) 92241-9531

(*) Notice: Subject to any disclaimer, the term of this patent is extended or adjusted under 35 U.S.C. 154(b) by 1006 days.

(21) Appl. No.: 11/101,289

(22) Filed: Apr. 7, 2005

(65) Prior Publication Data
US 2006/0242715 A1 Oct. 26, 2006

(51) Int. Cl.
G08B 13/00 (2006.01)
(52) U.S. Cl. ...................... 340/541; 340/565
(58) Field of Classification Search .............. 340/541, 340/565
See application file for complete search history.

(56) References Cited

U.S. PATENT DOCUMENTS

| 5,117,223 | A * | 5/1992 | Tanner ............ 340/693.5 |
| 5,777,551 | A * | 7/1998 | Hess ................ 340/541 |
| 5,850,180 | A * | 12/1998 | Hess ................ 340/541 |
| 6,049,273 | A * | 4/2000 | Hess ................ 340/539.11 |
| 6,441,731 | B1 * | 8/2002 | Hess ................ 340/539.26 |
| 7,042,353 | B2 * | 5/2006 | Stilp ................ 340/539.22 |
| 7,096,001 | B2 * | 8/2006 | Addy et al. ............ 455/404.1 |
| 7,174,176 | B1 * | 2/2007 | Liu ................ 455/462 |
| 7,209,729 | B2 * | 4/2007 | Oyagi et al. ............ 455/404.1 |

* cited by examiner

Primary Examiner—Travis R Hunnings
(74) Attorney, Agent, or Firm—Raymond M. Galasso; Galasso & Associates, L.P.

(57) ABSTRACT

A telephone messaging system with active security feature is disclosed. In one form of the invention, a telephonic security and recording system includes a cordless telephone security base including electronics operable to provide telephonic and security features. The electronics a telephonic and security processor operable to process security and telephonic based processes, a memory device coupled to the processor and operable to store information associated with providing telephonic and security features. The cordless telephone security base further includes a display coupled to the processor and operable to display telephonic and security information and at least three telephonic line transceivers operable to communicate with an analog telephonic network. A wireless handset transceiver is operable to wirelessly couple the analog telephonic network to a wireless handset and at least three read/write optical compact disk drives operable to record security and telephonic information are provided. The telephonic security and recording system further includes a digital memory card port sized to receive a digital memory card and a cordless telephone handset wirelessly coupled to the cordless telephone security base.

18 Claims, 2 Drawing Sheets

TELEPHONE MESSAGING SYSTEM WITH ACTIVE SECURITY FEATURE

FIELD OF THE DISCLOSURE

The invention relates generally to security systems, and more particularly to a telephone messaging system with an active security feature.

BACKGROUND

The home security industry is a multi-billion dollar industry that offers a staggering variety of security products, systems and services for protecting home an individual's home, property and family. However, most conventional security systems are complex and require skilled technicians to install hardware components. For example, typical home security systems may consist of several components that are integrated together to form a home security network. Such a network may include a control panel for activating and deactivating an alarm, motion sensors for detecting movements within a room, security cameras and/or video monitors for video recording hallways, rooms, entryways, grounds, etc. Most home security systems also include home monitoring services for remote security monitoring of a home or premises in the event of a break in.

One drawback to a home security system that includes remote monitoring is that the system can be costly to install, maintain, and monitor. For example, some security monitoring services charge an upfront fee for installing a security systems and further require a user to sign an annual or semi-annual contract with monthly installment fees. Such an arrangement may not be desired by some homeowners, renters, or businesses that do not want to make an investment in a security system that is permanently installed at a location. As such, what is needed is a flexible and inexpensive security system that allows for easy installation and operation.

BRIEF DESCRIPTION OF THE DRAWINGS

Other advantages, features and characteristics of the invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE FIGURES

Figure 1:
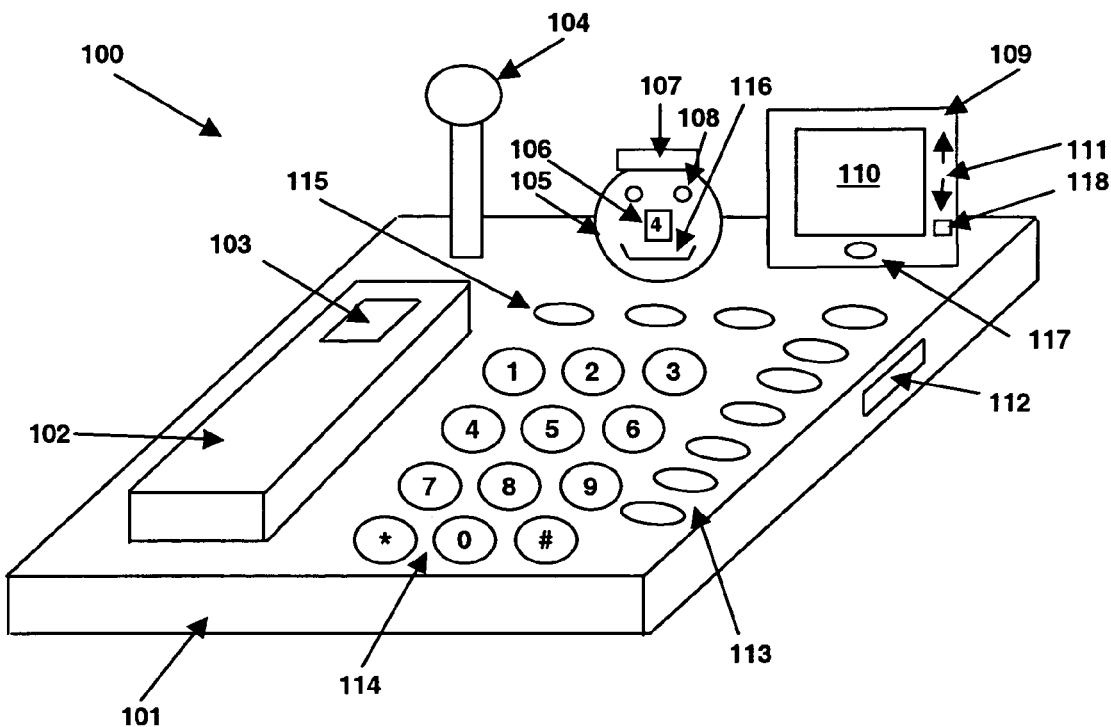
FIG. 1 illustrates a telephonic security system including a cordless telephone security base and cordless telephone security handset according to one embodiment of the invention.

A telephone messaging system with an active security feature is disclosed. According to one aspect of the invention, a telephonic security system is disclosed. The system includes a cordless telephone security base having a voicemail system operable to output an outgoing message and record incoming messages using a digital medium and a security system operable to monitor activities proximal to the cordless telephone base. The security system includes a motion detector operable to detect motion proximal to the cordless telephone security base and a security camera operatively coupled to the motion detector to record digital images in response to detecting motion using the motion detector. A microphone is coupled to a portion of the cordless telephone security base and operable detect audio signals in response to detecting the motion. The telephonic security system further includes a digital recording system housed within the cordless telephone security base and operable to record the incoming messages, the digital images, and the audio signals using the digital medium. A cordless telephone security handset is communicatively coupled to cordless telephone security base and operable to initiate telephonic and security control features.

According to a further aspect of the invention, a telephonic security and recording system includes a cordless telephone security base having a digital, camera operable to periodically record images, a graphical user interface operable to display telephonic and security information and a telephonic keypad for inputting telephone numbers. The telephonic security and recording system further includes a cordless telephone handset having a housing including electronics for wirelessly communicating with the cordless telephone base and a storage compartment coupled to a portion of the housing and operable to store on or more articles for writing a note.

In another aspect of the invention, a telephonic security and recording system includes a cordless telephone security base including electronics operable to provide telephonic and security features. The electronics a telephonic and security processor operable to process security and telephonic based processes, a memory device coupled to the processor and operable to store information associated with providing telephonic and security features. The cordless telephone security base further includes a display coupled to the processor and operable to display telephonic and security information and at least three telephonic line transceivers operable to communicate with an analog telephonic network. A wireless handset transceiver is operable to wirelessly couple the analog telephonic network to a wireless handset and at least three read/write optical compact disk drives operable to record security and telephonic information are provided. The telephonic security and recording system further includes a digital memory card port sized to receive a digital memory card and a cordless telephone security handset wirelessly coupled to the cordless telephone security base.

FIG. 1 illustrates a telephonic security system including a cordless telephone security base and cordless telephone security handset according to one embodiment of the invention. A telephonic security system 100 includes a telephone security base 101 and cordless telephone security handset 102 wirelessly coupled to telephone security base 101. Cordless telephone security handset 102 includes a handset display 103 and a keypad and function keys mounted flush to avoid accidental touching or selection (not expressly shown). Handset display 103 may also include electrical contacts for interfacing telephone security base 101 for recharging a battery within cordless telephone security handset 102 for powering electronics contained within (not expressly shown). In one embodiment, cordless telephone security handset 102 may include a pocket or sleeve sized to store an article such as a pen, pencil, paper, etc. to allow a user to write a message.

Cordless telephone security handset 102 further includes a battery compartment (not expressly shown) for housing a low-voltage battery for powering cordless telephone security handset 102. In one embodiment, a low-voltage battery source which may include one or more charge ports or charge receptacles for recharging rechargeable batteries if used and may be connected to an external power source or to a power source provided by cordless telephone security base 101 operable to provide power sufficient to recharge rechargeable batteries of cordless telephone security handset 102.

Cordless telephone security base 101 and handset 102 include a housing formed of a durable plastic material such as a high-impact durable plastic material and is formed generally as a rectangular-shaped housing and may be formed using one or more plastic manufacturing processes. For example, a plastic manufacturing process of injection molding or blow molding may used to form housings for cordless telephone security base 101 and handset 102. Injection molding is a process that is used in mass production of materials and includes melted plastic being forcefully injected into a relatively cool mold. As the plastic material hardens, it takes on the shape of the mold cavity. One skilled in the art can appreciate that other methods may also be used either alone or in combination with the methods described above. Additionally, other shapes and dimensions may be selected for forming cordless telephonic security base 101 and cordless telephone security handset 102 as desired.

Cordless telephone security base 101 further includes a security camera 104 positioned above cordless telephone security base 101 for capturing digital images and/or video proximal to cordless telephone security base 101. In one embodiment, security camera 104 may include a fish-eye lens allowing for a wider view angle when capturing or recording digital images or video. Cordless telephone security base 101 further includes an interactive control device 105 having a display counter 106 operable to display the number of newly recorded voice messages and an input button 107 operable to activate playing of a recorded voice message. Interactive control device 105 further includes status light emitting diodes (LEDs) 108 to indicate that a new voice mail message has been recorded and a speaker 117 for outputting messages. In one embodiment, interactive control device 105 is formed in a spherical shape having a head-like appearance with LEDs 108 shaped as eyes, display counter 106 shaped as a nose, a speaker 117 shaped as a mouth. Input button 107 may be formed as a hat and placed on top of interactive control device 105 for enabling selecting a playback or audio output for various functions or messages including voice mail messages, security reports, conference calls, or other audible outputs that may be provided by telephonic security system 100.

Cordless telephone security base 101 further includes a base display 110 such as flat panel display (FPD) which may include an liquid crystal diode (LCD), Thick Film Transistor (TFT) display, a touch screen and the like. Base display 110 includes display drivers (not expressly shown) operable to display a graphical user interface (GUI) 109 which may be manipulated by one or more input devices such as scroll buttons 111 and/or selection button 118 or touch screen buttons (not expressly shown) for viewing information to be displayed by telephonic security system 100. For example, various types of telephonic and security information may be presented or selected including caller identification information, stored or recorded messages, security messages or violations, etc. In one embodiment, a user may play-back a digital video or images recorded by security camera 104. In another embodiment, telephonic security system 100 may include access to a network such as the Internet and may provide allow browsing contents of the Internet via a browser display within GUI 109.

Cordless telephone security base 101 further includes a keypad 114 operable to allow a user to make a telephone call, function buttons 115 such as a redial button, a speed dial button, a conference call button, a mute button, a telephone line button, volume buttons, a speakerphone button, a panic button, a '911' button or any other type of button operable to enhance the functionality of telephonic security system 100. In one embodiment, a series of programmable speed dial buttons 113 may be provided to allow a user to configure or program various phone numbers as desired.

During operation, a user may utilize telephonic security system 100 similar to a conventional telephone and place phone calls using handset 102 and/or keypad 114, programmable speed dial buttons 113, or function buttons 115. For example, a user may activate one or more programmable speed dial buttons 113 in association with placing a call to a single party or may use any combination of keys to place a conference call with plural participants.

During receipt of a call, telephonic security system 100 includes logic to identify a caller using caller ID and may further allow for other features such as call forwarding, call blocking, call redialing, or incoming call processing. In one embodiment, a user may read a list of missed calls using base display 110 and may scroll calls using scroll buttons 111 allowing a user to use a displayed number and perform a function such as programming the number into a programmable speed dial buttons 113, blocking a number through activating a series of buttons on keypad 114, redialing a telephone number, etc. Other functions may also be employed for using telephone numbers received via an incoming call to telephonic security system 100.

Cordless telephone security base 101 and cordless telephone security handset 102 may also include a panic button and a security button allowing a user to contact or speed dial an emergency contact number such as '911' or activate a security feature of telephonic security system 100. For example, a user may not be able to locate cordless telephone security handset 102 and may only have sufficient time to activate a panic button or '911' button provided with cordless telephone security base 101. In this manner, a user that may have fallen to mischief or have become fatally impaired, critically ill, etc. may use little effort to place an emergency telephone call.

Telephonic security system 100 further includes a voice mail system for recording an unlimited time and number of messages through providing a digital recording medium that takes advantage of compressing messages into a format to allow for virtually unlimited storage. For example, telephonic security system 100 may include several locations or storage devices for storing messages including one ore more optical recording disk drives, mini-disk drives, flash or compact memory and/or other various types of storage mediums. Telephonic security system 100 may include a database having file identification and description information for each message. In one embodiment, each message may be stored in file format that may include header information to describe the telephone number, caller ID, date and time, length of message, and other message inherent information. For example, category information may also be provided as a part of a message including the nature of a message, message priority, or a mailbox or user identification for a multiple user environment. Information may be stored within a header portion of message file as meta data, meta tag, or other identification-like data formats. The contents of each message may be stored in a compressed audio or video format sufficient to allow for playback of a message without forgoing audio quality. For example, some audio, imaging, and video formats may include MIDI, MP3, WAV, JPEG, TIFF, BMP, MPEG, AVI and the like.

Telephonic security system 100 includes a voicemail module that works in association with interactive control device 105 to playback messages. For example, status LEDs 108 may be illuminate to indicate that a message is waiting and display counter 106 may display the number of new messages that have been recorded. A user may then activate button 107 to playback a message output by speaker 116 and subsequently activate function buttons 115 to save or erase a message.

Telephone security system 100 also provides security features through recording environmental activities occurring within a security network established by telephonic security system 100. For example, if an intruder is proximally located to cordless telephone security base 101 while a telephonic security system 100 is activated or placed in a security mode of operation, a motion sensor operably associated with telephonic security system 100 may detect the intruder and security camera 104 may capture one or more digital images and store each image within digital recording medium for playback at another time. Additionally, microphone 117 may be activated to record sounds that may be occurring. Telephonic security system 100, having telephonic capabilities, may also send an emergency signal to a security monitoring service, local authorities, etc. as needed. As such, through providing a system that integrates both security features and telephonic features, an efficient and low-cost security system may be realized.

In one embodiment, telephonic security system 100 may generate security reports based on activities that may occur while a system is activated. For example, a user may place telephonic security system 100 in an active security mode and may be gone for a period of time (i.e. several days, a week, etc.). Upon the user returning, a user may request a security report through activating a security report function button or requesting a security report using a voice recognition feature of telephonic security system 100 as described below. Upon a user requesting a security report, telephonic security system 100 may determine if one or more instances exist and provide a report, through displaying one or more audio, digital image, and/or video recordings or outputting an audio report. In this manner, a type of 'security voice mail' may be provided by telephonic security system 100 to record security violations when a user is not present.

Figure 2:
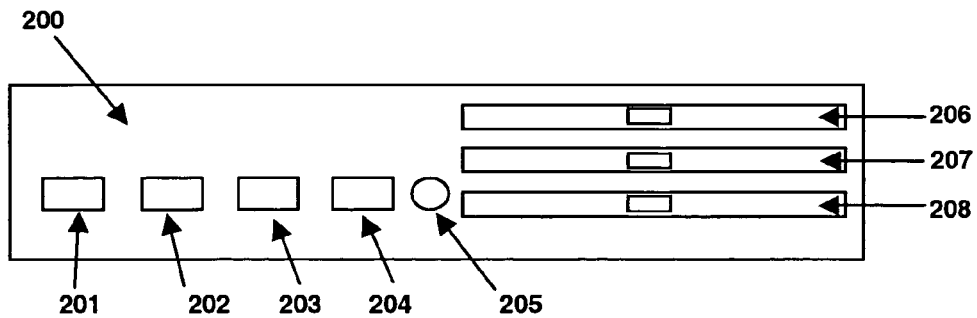
FIG. 2 illustrates a rear perspective view of a telephonic security system according to one embodiment of the invention.

FIG. 2 illustrates a rear perspective view of a telephonic security system according to one embodiment of the invention. A telephonic security system illustrated generally at 200 includes a real panel 209 having a first analog telephone line-in port 201, a second analog telephone line-in port 202, and a third analog telephone line-in port 203. Telephonic security system 200 further includes a network port 204 operable to allow access to a local area network (LAN), wide area network (WAN), Internet gateway, etc. and may be provided in association with a modem or network interface card (NIC). Other forms of network communication interfaces may provided also be provided including providing a wireless access point such as an 802.11(x) wireless point, accessing a cable network, accessing a digital subscriber line (DSL), etc.

Telephonic security system 200 further includes a power receptacle 205 for coupling a power source to power electronics of telephonic security system 200. Rear panel 209 further provides access to a first optical recording disk drive 206, a second optical recording disk drive 207, and a third optical recording disk drive 208. Each optical disk drive may be provided as one or more types of read/write recording optical disk drives to allow for reading and recording various types of optical disks which may employ various types of recording speeds and formats. For example, optical recording disks such as compact disc (CD) or digital video disc (DVD) formats may be used having various types of recording speeds such as 12×, 24×, 48×, etc. For example, a CD may record up to one hour of audio while a DVD may record up to six hours of audio. Other data storage formats for optical disk storage may also be considered as needed. During use, telephonic security system 200 may utilize first optical recording disk drive 206 to record voicemail messages, second optical recording disk drive 207 to record security data such as video, sound, photos, etc., and third optical recording disk drive 208 to back up first and second optical recording disks.

In one embodiment, first optical recording disk drive 206 may be used to record incoming and outgoing voice messages for a voice mail system of telephonic security system 200 while second optical recording disk drive 207 may be used to record security information such as digital images captured during a security violation. Third optical recording disk drive 208 may be also be used to back-up information stored on first optical recording disk drive 206 and second optical recording disk drive 207. For example, first optical recording disk drive 206 and second optical recording disk drive 207 may record using a CD format that may record up to for example, 800 MB of information, while third optical recording disk drive 208 may record in a DVD format of up to 4.7 GB of information. Other combinations of disk drive and disk storage types may also be considered. For example, first optical disk drive may be operable to record both voice mail messages and digital images while second optical disk drive may be operable to back-up information stored on first optical disk drive. In this manner, only two optical disk drives may be needed to record information.

Figure 3:
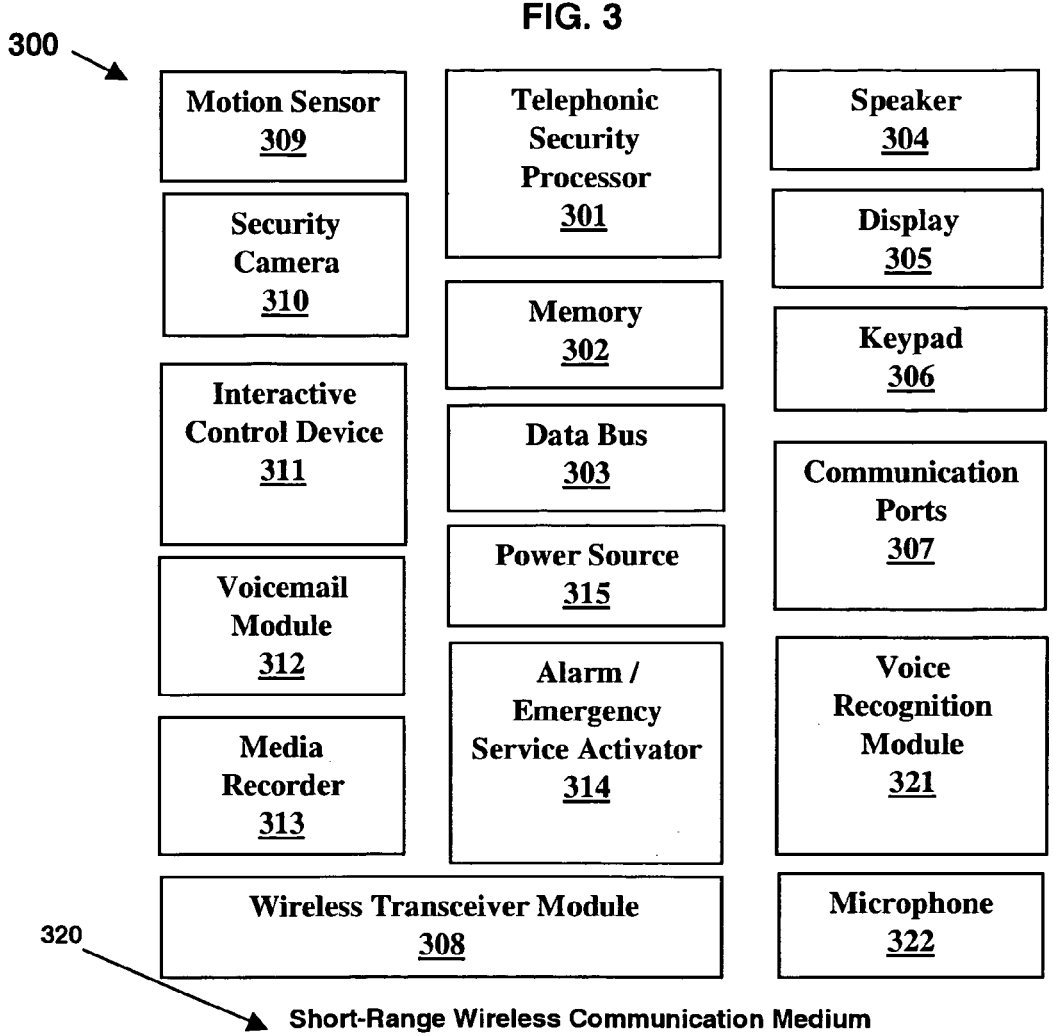
FIG. 3 illustrates a functional block diagram of a telephonic security system according to one embodiment of the invention.
Figure 3:
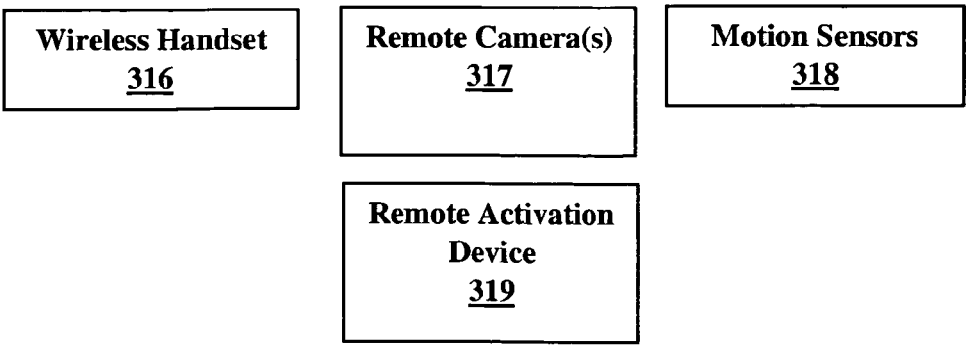

FIG. 3 illustrates a functional block diagram of a telephonic security system according to one embodiment of the invention. A functional block diagram of telephonic security system, illustrated generally at 300, generally illustrates features of a telephonic security system. Various other combinations and/or configurations of components and modules may be provided to illustrate a telephonic security system. Additionally, one or more portions of telephonic security system 300 may be provided as software, hardware, or firmware such that the underlying functionality of a module, component, or device is realized.

Telephonic security system 300 includes a telephonic security processor 301 may include one or more multiple bit processors such as a microprocessor, digital signal processor, an embedded processor such as an ARM processor or application specific processor, or various other types of processors. Processor 301 is coupled to a memory 302 such as RAM, ROM, EPROM, EEPROM, Flash Memory, or other types of memory and/or programmable memory as needed. Processor 301 may also include various types of onboard memory such as RAM, ROM, EEPROM, etc.

A data bus 303 provides for communicating information between each component or device within telephonic security system 300 and may configured as a multi-bit read/write data bus with control logic for controlling information flow within telephonic security system 300. Telephonic security system 300 further includes a display 305 such as a flat panel display (FPD), liquid crystal display (LCD), thin film transistors (TFTs), and the like operable to be used with a graphical user interface (GUI) and an input control device for interacting with information displayed within display 305.

A keypad 306 may include several types of keys such as a telephone based ten-key keypad, function keys or function buttons such as a redial button, a speed dial button, a conference call button, a mute button, a telephone line button, volume control buttons, a speakerphone button, a security report button, a panic or '911' button or any other type of button to enhance the functionality of telephonic security system 300. In one embodiment, keypad 306 may include a series of programmable speed dial buttons may be also provided to allow a user to configure or program various phone numbers.

Telephonic security system 300 further includes an interactive control device 311 operable to output an operating status of telephonic security system 300. For example, a voicemail module 312 may be operably coupled to interactive control device 311 an may allow for outputting voicemails recorded from incoming callers. Voicemail module 312 manages storing of new calls, saved calls, greetings, etc. A media recorder 313 is functionally coupled to voicemail module 312 and telephonic security processor 301 and may be used to record both security and telephonic based information and events. Media recorder 313 may include various types of read/write memory such as mini-hard disk drives, and optical disk drives, removable flash memory or a flash drives, mass storage digital tape, or any other type of read/write memory operable to store security and telephonic based information.

Telephonic security system 300 also include an alarm/emergency service activator 314 for activating various types of alarms, contacting a security monitoring service in the event of a security breach, contacting an emergency service including 911 services in the event of an accident and/or to contact the authorities or police department. In one embodiment, alarm/emergency service activator 314 may output a loud audible noise or alarm via speaker 304 in the event of a security breach alerting an intruder or resident that a security breach has been detected.

Telephonic security system 300 further includes communications ports 307 operable to allow for coupling of a landline and/or terrestrial based networks such as analog phone lines, LANs, security networks, monitoring service networks, or other types of communication networks. Various types of communication modules may also be used to connect with a network including, but not limited to, analog modems, network interface cards, wireless modems, cable modems, satellite communication modems and the like.

Telephonic security system 300 further includes a power source 315 operable to distribute power to various electronic components within telephonic security system 300 and may be coupled to an external AC power source (e.g. 110 volt, 220 volt) via an AC power adaptor (not expressly shown) which may be operable to convert 110 Volt and/or 220 Volt AC power to a DC power. AC power adaptors allow an AC power source to be converted into a direct current DC power for powering electronics and/or recharging a power source such as a power source of a wireless handset 316. In one embodiment, an AC power adapter may include a switch to allow for selecting 110 Volt or 220 Volt allowing for conversion of either AC power source.

Telephonic security system 300 includes at least one wireless transceiver 308 configured to communicate via a short-range wireless communication medium 320 and may operate over one or more frequencies (i.e. 2.4 GHz, 5.8 Ghz, etc.). For example, telephonic security system 300 may be wirelessly coupled to one or more wireless handset(s) 316, remote camera(s) 317, motion sensor(s) 318, remote activation device(s) 319, or other types of wireless communication devices that may be coupled to telephonic security system 300 to enhance or extend the functionality or features for promoting security and telephonic operation of telephone security system 300.

In one embodiment, wireless transceiver 308 may include one or more types of wireless of communication transceivers. For example, wireless transceiver 308 may include spread spectrum based communication for communicating with handsets while other wireless devices such as remote camera 317 and wireless motion sensor 318 may be wirelessly coupled to telephonic security system 300 using a second wireless communication transceiver operable to communicate via another communication medium such Bluetooth or 802.11(x) based medium, etc. X10-based communication mediums may also be used.

Several types of motions sensor(s) 318 may also be used with telephonic security system 300 including microwave sensors, acoustic sensors, ultrasonic sensors, sound detection sensors, infrared sensors, photoelectric sensors, magnetic sensors, and magnetic contact circuits. Each sensor may be provided in either a wire line or wireless configuration and telephonic security system 300 may be configured to accommodate one or more types of sensors. Additionally, telephonic security system 300 may also be integrated as a part of an existing home security system and may be used to monitor activities and may be used as, or in association with, a control panel for activating and deactivating an existing home security system (not expressly shown). For example, communication ports 307 may be adapted to receive inputs from various sensors provided within a home security network and may monitor each sensor and record an security event or security violation using media recorder 313. In this manner, security system 300 may indicate to a user that a security violation may have occurred and further provide a security report to a user via interactive control device 311 and/or display 305. Telephonic security system 300 may also be provided in association with various types of home security systems or networks including hardwired security systems, wireless security systems, wireless motion sensors, and/or web connected systems.

Motion sensor(s) 318 may be provided as hardwired and/or wireless allowing a user to place motion sensor(s) 318 where needed without the hassle of wires. Wireless motions sensors are very effective for flexible implementation. Some motion sensor(s) 318 may be placed outdoors and are weatherproof with dawn/dusk sensor mechanisms to allow telephonic security system 300 to monitor for night-time intruders. Signal range for motion sensor(s) 318 may vary from a few feet to approximately five thousand (5000) square feet. Additionally, some motion sensor(s) 318 may combine both infrared and microwave signals for additional or dual mode sensing.

Security camera 310 and/or remote camera(s) 317 may be operable as digital cameras and/or digital video recorders or standard video recorders. For example, telephonic security system 300 may record video images captured by a remote camera 317 and display video images in real-time to a user via display 305. Additionally, memory 302 may be used in association with telephonic security processor 310 and media recorder 313 to store video or digital images captured by security camera 310 and/or remote camera 317 for access at a later time. For example, an optical disk drive provided in association with media recorder 317 may be used to record MPEG encoded video onto a CD or DVD. If more than one security camera 310 or remote camera 317 is recording, more than one optical disk drive or read/write recording medium may be used to record video and or images. In another embodiment, audio information may also be captured by microphone operably associated with telephonic security system 300 allowing for both image data and audio data to be captured (not expressly shown).

During operation, telephonic security system 300 initializes and ensures that each component is functioning properly. For example, telephonic security processor 301 may include an initialization sequence or routine that is used to initialize each electronic component to determine an operating or functional status of each component. Telephonic security processor 301 may request information stored at a specific location or address within memory 302 and contents of memory 302 may be placed on a data bus 303 for use by other components. For example, a display driver associated with display 305 may read data communicated via data bus 303 and targeted for displaying within a GUI of display 305. Display 305 may then present the information within a GUI for a user to view and select as desired. For example, memory 302 and/or media recorder 313 may access one or more lists to be presented within display 305 for a user to view. Lists such as a previously called list, missed call list, incoming call list, most frequently called list, address or telephone number list, voicemail lists or other type of telephone-based lists may be presented within display 305. Each entry within the list may be maintained by a database stored within memory 302 and/or media recorder 313 and may include caller identification information (i.e. name, telephone number, date/time stamps of last communication, etc.). Other types of lists may also be maintained within memory 302 and/or media recorder 313 such as security based lists including a list of most recent security events, list of previous security events, surveillance video footage list, digital image lists, audio file lists, security status list for each sensor or camera, or various other type of security based lists.

In one embodiment, telephonic security system 300 may be configured to be voice activated and may employ a voice recognition module 321 allowing a user to operate telephonic security system 300 hands free. For example, telephonic security system 300 may include a voice recognition module 321 operable to convert audio signals into digital representation of a voice to determine the audio contents detected by telephonic security system 300. One embodiment may include a user providing an audio command such as 'check voicemail'. Voice recognition module 321 may then convert the audio command to authenticate the user or may prompt the user to provide a password. A user may then either enter the password using keypad 306 or vocally inform telephonic security system 300 of the password. Voice recognition module 321 in association with telephonic security processor 301 may then authenticate the user and output the user's voicemail messages. In one embodiment, multiple users may utilize telephonic security system 300 and voice recognition module may be programmed to recognize various authorized users. If an unidentified user is attempting to breach telephonic security system 300, telephonic security processor 301 may record digital images and an audio file of the unidentified individual allowing for displaying or outputting at a later time when an authorized individual uses telephonic security system 300. In one embodiment, as a user leaves a residence or building and wishes to activate telephonic security system 300, a user may activate using voice recognition module 321 through providing a command such as 'On-Guard', 'Activate', 'Deactivate', etc. In this manner, an authorized user may not need to remember a password for activating, deactivating, accessing telephonic information, etc.

In one embodiment, remote activation device(s) 319 may be linked to telephonic security system 300 through wireless transceiver 308. Remote activation device 319 may include two activation buttons. A first button may be used for calling an emergency service such as '911' and a second button may be used to activate portions of telephonic security system 300 to record digital images using remote camera(s) 317, security camera(s) 310, and/or microphone 322. For example, remote activation device 319 may be provided as a necklace having a smiley face and eyes as buttons, a heart, a flower, a locket, a butterfly, etc. Remote activation device 319 may also be provided as a wristband, key chain, key fob, or any other type of accessory that a user may carry.

Note that although an embodiment of the invention has been shown and described in detail herein, along with certain variants thereof, many other varied embodiments that incorporate the teachings of the invention may be easily constructed by those skilled in the art. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. Accordingly, the invention is not intended to be limited to the specific form set forth herein, but on the contrary, it is intended to cover such alternatives, modifications, and equivalents, as can be reasonably included within the spirit and scope of the invention.

What is claimed is:

1. A telephonic security system comprising:
   a cordless telephone security base including a voicemail system operable to output an outgoing message and record incoming messages using a digital medium;
   a security system operable to monitor activities proximal to the cordless telephone base, the security system including:
   a motion sensor operable to detect motion proximal to the cordless telephone security base;
   a digital camera operatively coupled to the motion detector to record digital images in response to detecting motion using the motion detector;
   a microphone coupled to a portion of the cordless telephone security base and operable to detect audio signals in response to detecting the motion;
   a digital recording system housed within the cordless telephone security base and operable to record the incoming messages, the digital images, and the audio signals;
   a cordless telephone security handset communicatively coupled to the cordless telephone base and operable to initiate telephonic and security control features; and
   an interactive control device coupled to a top portion of the cordless telephone base, the interactive control device including:
   a generally spherically shaped housing formed to include a cartoon-like face having two eyes, a nose, a mouth and a hat-like button;
   wherein the nose includes an LED display operable to display a number of newly recorded messages;
   wherein each of the eyes include an illuminator operable to flash intermittently when a message has been recorded; and
   wherein the mouth is proximally located to the microphone to receive audio inputs.

2. The system as recited in claim 1 further comprising at least three digital optical disk recording devices accessible from a rear portion of the cordless telephone security base.

3. The system as recited in claim 1 further comprising:
   a first optical disk operable as a read/write optical disk recorder operable to record the incoming messages and the digital images; and
   a second optical disk operable as a read/write optical disk recorder operable to back-up the first optical disk.

4. The system as recited in claim 1 wherein the cordless telephone security base includes a voice recognition module operable to recognize voice commands and access information and functions in response to validating a user.

5. The system as recited in claim 4 further comprising the cordless telephone security base operable to compare a digital representation of a password detected by the voice recognition module with a list of valid user passwords.

6. A telephonic security system comprising:
a cordless telephone security base including a voicemail system operable to output an outgoing message and record incoming messages using a digital medium;
a security system operable to monitor activities proximal to the cordless telephone base, the security system including:
a motion sensor operable to detect motion proximal to the cordless telephone security base;
a digital camera operatively coupled to the motion detector to record digital images in response to detecting motion using the motion detector;
a microphone coupled to a portion of the cordless telephone security base and operable to detect audio signals in response to detecting the motion;
a digital recording system housed within the cordless telephone security base and operable to record the incoming messages, the digital images, and the audio signals;
a cordless telephone security handset communicatively coupled to the cordless telephone base and operable to initiate telephonic and security control features; and
at least three digital optical disk recording devices accessible from a rear portion of the cordless telephone security base, wherein the three digital optical disk recording devices include:
a first optical disk operable as a read/write optical disk recorder operable to record the incoming messages;
a second optical disk operable a read/write optical disk recorder operable to record the digital images; and
a third optical disk operable as a read/write optical disk recorder operable to back-up information stored on the first and second optical disks.

7. A telephonic security system comprising:
a cordless telephone security base including a voicemail system operable to output an outgoing message and record incoming messages using a digital medium;
a security system operable to monitor activities proximal to the cordless telephone base, the security system including:
a motion sensor operable to detect motion proximal to the cordless telephone security base;
a digital camera operatively coupled to the motion detector to record digital images in response to detecting motion using the motion detector;
a microphone coupled to a portion of the cordless telephone security base and operable to detect audio signals in response to detecting the motion;
a digital recording system housed within the cordless telephone security base and operable to record the incoming messages, the digital images, and the audio signals; and
a cordless telephone security handset communicatively coupled to the cordless telephone base and operable to initiate telephonic and security control features, the cordless telephone security handset including:
a housing including electronics for communicating with the cordless telephone security base; and
a storage compartment coupled to a portion of the housing and operable to store writing instrument for taking a note.

8. The system of claim 7 further comprising a remote control activation device wirelessly coupled to the cordless telephone security base and including an alert button operable to initiate an emergency telephone call via the cordless telephone security base.

9. The system as recited in claim 7 further comprising operably associated with cordless telephone security base to selectively block undesired incoming telephone calls.

10. A telephonic security and recording system comprising:
a cordless telephone security base including:
a digital camera operable to record digital images;
a graphical user interface operable to display telephonic and security information;
a telephone keypad for inputting telephone numbers; and
a cordless telephone security handset including:
a housing including electronics for wirelessly communicating with the cordless telephone security base; and
a storage compartment coupled to a portion of the housing and operable to store on or more articles for writing a note.

11. The system as recited in claim 10 further comprising:
a voice activated interactive control device;
a voice mail module operably associated with the voice activated interactive control device; and
a security report stored within a digital media of the cordless telephone security base and operable to output one or more security events.

12. The system as recited in claim 11 further comprising:
an analog telephone communication port operable to couple the cordless telephone security base to a telecommunications network;
a wireless communication transceiver operable to couple at least one cordless telephone security handset; and
a wireless security device coupled to the cordless telephone security base and operable to provide a input to initiate recording information associated with the security event.

13. The system as recited in claim 10 wherein the wireless security device includes a motion sensor operable to detect motion remote to the cordless telephone security base.

14. The system as recited in claim 13 further comprising a wireless digital camera wirelessly coupled to the cordless telephone security base and positioned to capture a digital image in response to the motion sensor detecting motion, the digital image being communicated to the cordless telephone security base and recorded by an optical read/write optical disk drive associated with the cordless telephone security base.

15. The system of claim 14 further comprising:
an alert button coupled to the cordless telephone security base and operable to initiate an emergency telephone call in response to a user activating the alert button; and
a remote alert button coupled to a remote device operable to initiate an emergency telephone call using a wireless communication network provided by the cordless telephone security base in response to a user activating the remote alert button.

16. The system of claim 15 further comprising the cordless telephone security base including a communication port operable to be coupled to a security monitoring system.

17. A telephonic security and recording system comprising:
a cordless telephone security base including electronics operable to provide telephonic and security features, the electronics comprising:

a telephonic and security processor operable to process security and telephonic based processes;

a memory device coupled to the processor and operable to store information associated with providing telephonic and security features;

a display coupled to the processor and operable to display telephonic and security information;

at least three telephone line transceivers operable to communicate with an analog telephone network;

a wireless handset transceiver operable to wirelessly couple the analog telephone network to a wireless handset;

at least three read/write optical compact disk drives operable to record security and telephonic information; and a digital memory card port sized to receive a removable digital memory card;

a cordless telephone security handset wirelessly coupled to the cordless telephone security base;

a message controller operably coupled to a top portion of the base, the message controller including a substantially spherical shape; and a digital camera mounted to the top portion of the cordless telephone security base and operable to record digital images using at least one of the three read/write optical compact disk drives.

18. The apparatus of claim 17 further comprising:

a recharge receptacle formed along the top portion of the housing and including contact regions sized to align with contacts of the cordless telephone security handset for recharging the cordless telephone security handset; and a remote control device including a security command button and wirelessly coupled to the cordless telephone security base and operable to initiate at least an emergency contact command and a security activation command in response to a user activating the security command button.

* * * * *